United States Patent
Ohtake et al.

[11] Patent Number: 6,057,624
[45] Date of Patent: *May 2, 2000

[54] CANNED MOTOR WITH STATOR CAN REINFORCEMENT

[75] Inventors: Koichi Ohtake, Yokohama; Tetsuya Hiramatsu, Machida; Hiroyuki Kato, Yokohama; Shuichiro Honda, Kawasaki, all of Japan

[73] Assignee: Ebara Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,853

[22] Filed: Apr. 10, 1997

[30] Foreign Application Priority Data

Apr. 16, 1996 [JP] Japan ................................. 8-118417

[51] Int. Cl.$^7$ ..................................................... H02K 3/48
[52] U.S. Cl. ........................... 310/214; 310/216; 310/254
[58] Field of Search ..................................... 310/214, 215, 310/87, 216, 284, 259, 261; 29/596, 598

[56] References Cited

U.S. PATENT DOCUMENTS

| | | | |
|---|---|---|---|
| 1,827,571 | 10/1931 | Fiene | 310/214 |
| 2,640,956 | 6/1953 | Buchanan | 310/214 |
| 2,858,462 | 10/1958 | Knaus | 310/214 |
| 3,468,019 | 9/1969 | Brown et al. | 310/214 |
| 4,147,946 | 4/1979 | Linscott, Jr. et al. | 310/214 |
| 4,572,980 | 2/1986 | Anderson et al. | 310/214 |
| 4,607,183 | 8/1986 | Bieber et al. | 310/214 |
| 5,341,561 | 8/1994 | Schorm et al. | 29/596 |
| 5,644,181 | 7/1997 | Kooken et al. | 310/216 |

FOREIGN PATENT DOCUMENTS

| | | |
|---|---|---|
| 0 612 135 | 8/1994 | European Pat. Off. . |
| 2 241 902 | 3/1975 | France . |
| 2-106145 | 4/1990 | Japan . |

*Primary Examiner*—Nestor Ramirez
*Assistant Examiner*—Tran N Nguyen
*Attorney, Agent, or Firm*—Oblon, Spivak, McClelland, Maier & Neustadt, P.C.

[57] ABSTRACT

A canned motor has a rotor having a rotor core and a rotor can covering an outer circumferential surface of the rotor core, and a stator disposed around the rotor with a gap left therebetween for rotating the rotor, the stator having a stator core and a stator can covering an inner circumferential surface of the stator core. The stator core has a plurality of slots defined therein at circumferentially spaced regular intervals and having respective open ends opening at the inner circumferential surface of the stator core, and a plurality of windings disposed in the slots, respectively. The slots include respective winding chambers with the windings housed therein, respective constricted throats disposed radially inwardly of the winding chambers, and respective stiffener chambers spaced radially inwardly from the constricted throats. A plurality of stiffeners are housed in the stiffener chambers, respectively.

11 Claims, 3 Drawing Sheets

CANNED MOTOR WITH STATOR CAN REINFORCEMENT

BACKGROUND OF THE INVENTION

1. Field of the Invention

The present invention relates to a canned motor for use with a pump actuatable thereby which is placed in a housing shared by the canned motor, and more particularly to a canned motor suitable for use in high-temperature, high-pressure environments at temperatures of 400° C. or higher and under pressures of 200 kgf/cm² or greater.

2. Description of the Prior Art

One conventional canned motor with a pressure-resistant structure is shown in FIGS. 1 and 2 of the accompanying drawings.

As shown in FIG. 1, the canned motor primarily comprises a rotor 2 fitted over a main shaft 1 and a stator 4 disposed around the rotor 2. A pump which can be actuated by the canned motor has an impeller (not shown) mounted on an end of an extension of the main shaft 1, which is rotatably supported by magnetic bearings. The stator 4 is fixedly supported in a cylindrical casing 3 having axially opposite end plates 13. The stator 4 comprises a stator core 7 of steel lamination and coil ends 8 which are housed in a space defined in the casing 3 and a stator can 15. The stator core 7 is mounted in the casing 3 hermetically covered by the stator can 15 in the form of a thin cylindrical wall covering an inner circumferential surface of the stator core 7.

The rotor 2 comprises a rotor core 5 of steel lamination and slot bar and a rotor can 6 in the form of a thin cylindrical wall covering an outer circumferential surface of the rotor core 5 and spaced slightly radially inwardly from the stator can 15.

The coil ends 8 project axially from axially opposite ends of the stator core 7, and are connected to windings 9 (see FIG. 2) disposed in the stator core 7.

As shown in FIG. 2, the stator core 7 has a plurality of slots 10 defined therein and successively positioned at given spaced intervals in the circumferential direction of the stator core 7. The slots 10 extend axially through the stator core 7 and have radially inner constricted ends 10b which are open at an inner circumferential surface of the stator core 7 and tapered portions 10c positioned slightly radially outwardly of the constricted open ends 10b. The windings 9, each comprising a plurality of twisted thin wires, are enclosed by sheets 11 of insulating paper and placed in respective winding chambers 10a in the respective slots 10. The windings 9 are retained in the winding chambers 10a against dislodgment therefrom by flat elongate wedge plates 12 of ceramics, for example, which are inserted into the respective tapered portions 10c.

Cylindrical coil end reinforcing tubes 14, each having an inside diameter which is the same as the inside diameter of the stator core 7, extend axially between the end faces of the stator core 7 and the end plates 13 of the casing 3. The stator can 15 is held against inner circumferential surfaces of the coil end reinforcing tubes 14 and the inner circumferential surface of the stator core 7. The stator can 15 prevents a fluid which is being handled by the pump from entering into the stator 4.

The stator can 15 is made of a cylindrical thin sheet of a metallic material such as a nickel alloy or the like, and has a small thickness ranging from about 0.2 to 1 mm. The stator can 15 is fixedly joined to the end faces of the stator core 7 and/or the end plates 13 of the casing 3 as by welding.

When an alternating current flows through the windings 9, the rotor 2 and the main shaft 1 rotate in unison with each other, causing the pump impeller to rotate for thereby pumping a fluid. Part of the fluid that is being handled by the pump is introduced into a gap between the rotor 2 and the stator 4 which are covered with the rotor can 6 and the stator can 15, respectively, thereby cooling the rotor 2 and the stator 4.

When the fluid being handled by the pump is subjected to a very high pressure such as of 200 kgf/cm² or higher, for example, the fluid introduced into the gap between the rotor 2 and the stator 4 exerts forces tending to press the stator can 15 into the slots 10. Therefore, portions of the stator can 15 forcibly project into the slots 10 through the constricted open ends 10b. The stator can 15 is thus liable to be damaged by edges of the constricted open ends 10b, and to push the wedge plates 12 for thereby displacing the windings 9, which may possibly suffer an insulation failure.

The coil end reinforcing tubes 14 have to be relatively thin because the coil ends 8 are inserted therethrough. When the coil end reinforcing tubes 14 are subject to a high pressure, they are easily deformed particularly at their ends, developing steps at their junctions to the stator core 7. Those developed steps expose corners of the stator core 7 which tend to cause damage to the stator can 15. The coil end reinforcing tubes 14 may be prevented from being deformed if they have an increased wall thickness for their sufficient mechanical strength. However, the wall thickness of the coil end reinforcing tubes 14 cannot be substantially increased due to limitations imposed by the shape of the slots 10 in the stator core 7 and the insertion of the coil ends 8.

SUMMARY OF THE INVENTION

It is therefore an object of the present invention to provide a canned motor which includes a stator can that is prevented from being deformed even under a high pressure of 200 kgf/cm² or higher, for example, for thereby allowing the canned motor to operate stably and safely.

To achieve the above object, there is provided in accordance with the present invention a canned motor comprising a rotor having a rotor core and a rotor can covering an outer circumferential surface of the rotor core, and a stator disposed around the rotor with a gap left therebetween for rotating the rotor, the stator having a stator core and a stator can covering an inner circumferential surface of the stator core, the stator core having a plurality of slots defined therein at circumferentially spaced regular intervals and having respective open ends opening at the inner circumferential surface of the stator core, and a plurality of windings disposed in the slots, respectively, the slots including respective winding chambers with the windings housed therein, respective constricted throats disposed radially inwardly of the winding chambers, and respective stiffener chambers spaced radially inwardly from the constricted throats, the stator further having a plurality of stiffeners housed in the stiffener chambers, respectively.

When the gap between the rotor and the stator is held in a high-pressure environment, i.e., filled with a fluid under a high pressure, tending to push the stator can into the slots, the stator can is brought into contact with the stiffeners and pushes the stiffeners radially inwardly toward the winding chambers. However, the stiffeners are prevented from being displaced radially inwardly into the winding chambers by the constricted throats. The stator can is thus prevented from being damaged at the open ends, and the pressure acting on the stator can does not act in the winding chambers. Since the pressure acting on the stator can is prevented from acting on the wedge plates by the stiffeners, the windings in the winding chambers are prevented from being unduly damaged.

Each of the stiffeners comprises a round rod of nonmagnetic ceramics having a circular cross-sectional shape. Forces which act on the stiffeners each in the form of a round rod of nonmagnetic ceramics when the stator can is deformed under a pressure buildup in the gap between the rotor and the stator are smoothly distributed over the stator core. Therefore, the stator can is prevented from being unduly deformed and damaged, and no undue forces are applied to the windings in the winding chambers.

Cylindrical coil end reinforcing tubes are joined to respective opposite axial ends of the stator core and each having a wall thickness substantially equal to a radial dimension of the stiffeners, the coil end reinforcing tubes having respective inner circumferential surfaces contiguous to the inner circumferential surface of the stator core, the stator can covering the inner circumferential surfaces of the coil end reinforcing tubes and the stator core. Since the coil end reinforcing tubes are sufficiently thick and strong, they are effective in preventing the stator can from being damaged in the high-pressure environment at the junctions between the stator core and the coil end reinforcing tubes.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 3:
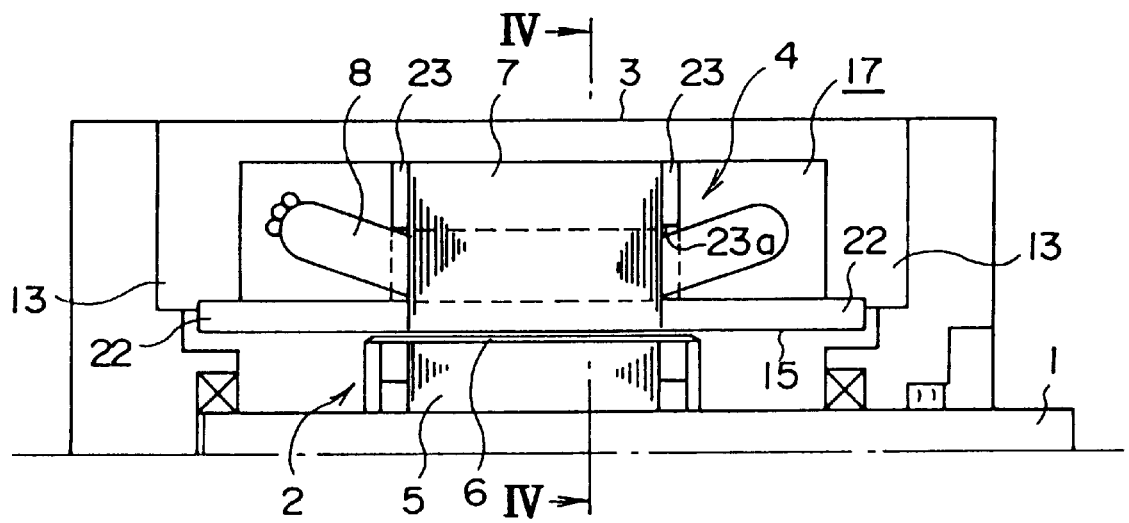
FIG. 3 is a fragmentary longitudinal cross-sectional view of a canned motor according to the present invention.
Figure 4:
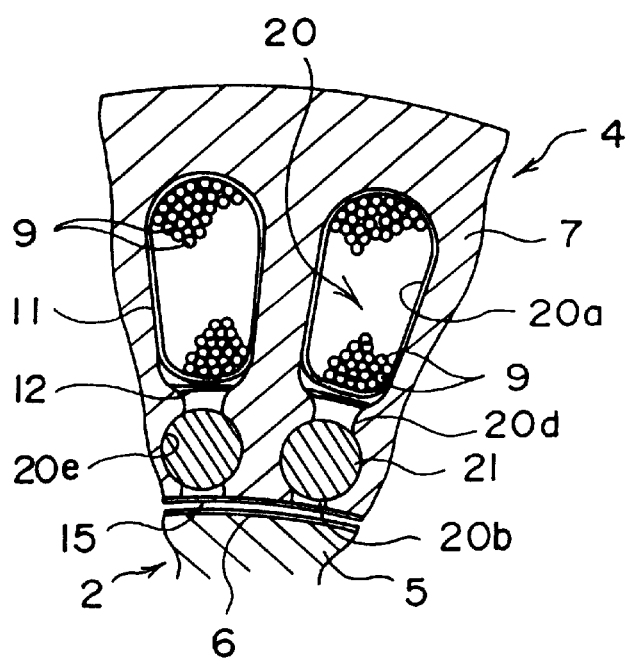
FIG. 4 is an enlarged fragmentary transverse cross-sectional view taken along line IV—IV of FIG. 3.

As shown in FIGS. 3 and 4, a canned motor according to the present invention comprises a rotor 2 fitted over a main shaft 1 and a stator 4 disposed around the rotor 2 with a radial gap left therebetween. A pump which can be actuated by the canned motor has an impeller (not shown) mounted on an end of an extension of the main shaft 1, which is rotatably supported by magnetic bearings. The canned motor and the pump are placed in a housing. The stator 4 is fixedly supported in a cylindrical casing 3 having axially opposite end plates 13. The stator 4 comprises a stator core 7 of steel lamination and coil ends 8 which are housed in a space defined in the casing 3 and a stator can 15 extending radially inwardly of the casing 3 and radially outwardly of the rotor 2. The stator core 7 is mounted inside of the cylindrical casing 13.

The rotor 2 comprises a rotor core 5 of steel lamination and slot bar and a rotor can 6 in the form of a thin cylindrical wall covering an outer circumferential surface of the rotor core 5 and spaced slightly radially inwardly from the stator can 15.

The coil ends 8 project axially from axially opposite ends of the stator core 7, and are connected to windings 9 (see FIG. 2) disposed in the stator core 7.

As shown in FIG. 4, the stator core 7 has a plurality of slots 20 defined therein and successively positioned at given spaced intervals in the circumferential direction of the stator core 7. The slots 20 extend axially through the stator core 7 and have respective winding chambers 20a which accommodate the windings 9, respectively, respective open ends 20b extending radially inwardly from the winding chambers 20a and opening at an inner circumferential surface of the stator core 7, respective constricted throats 20d near the winding chambers 20a in communication therewith, and respective stiffener chambers 20e defined between the constricted throats 20d and the open ends 20b and housing respective stiffeners 21. The slots 20 have a radial depth which is greater than the radial depth of the slots 10 shown in FIG. 2.

The windings 9, each comprising a plurality of twisted thin wires, are enclosed by sheets 11 of insulating paper and placed in respective winding chambers 20a in the respective slots 20. The windings 9 are retained in the winding chambers 20a against dislodgment therefrom by flat elongate wedge plates 12 of nonmagnetic ceramics, for example, which are inserted into respective tapered portions of the winding chambers 20a near the constricted throats 20d.

Each of the stiffener chambers 20e is defined by a pair of semicylindrical recesses defined in confronting wall surfaces of the slot 20 in the stator core 7. A stiffener 21 in the form of a rod of ceramics having a circular cross section is mounted in each of the stiffener chambers 20e. The stiffeners 21 thus placed in the respective stiffener chambers 20e close the open ends 20b, and have round outer circumferential surfaces positioned closely to the outer circumferential surface of the stator can 15. The stiffeners 21 and the stator can 15 extend axially parallel to each other in closely spaced relation to or in contact with each other.

Therefore, when the gap between the rotor 2 and the stator 4 is held in a high-pressure environment, i.e., filled with a fluid under a high pressure, tending to push the stator can 15 into the slots 20, the stator can 15 is brought into contact with the stiffeners 21 and pushes the stiffeners 21 radially inwardly toward the winding chambers 20a. However, the stiffeners 21 are prevented from being displaced radially inwardly into the winding chambers 20a by the constricted throats 20d. The stator can 15 is thus prevented from being damaged at the open ends 20b, and the pressure acting on the stator can 15 does not act in the winding chambers 20e. Since the pressure acting on the stator can 15 is prevented from acting on the wedge plates 12 by the stiffeners 21, the windings 9 in the winding chambers 20e are prevented from being unduly damaged.

Since the stiffeners 21 are in the form of round rods of ceramics, they are sufficiently resistant to compressive stresses. The stiffeners 21 are sufficiently strong even if a fluid being handled by the pump has a temperature in excess of 40° C., for example, forces which act on the stiffeners 21 when the stator can 15 is deformed under a pressure buildup in the gap between the rotor 2 and the stator 4 are smoothly distributed over the stator core 7. The stiffeners 21 in the form of round rods of ceramics can easily be manufactured. The stiffeners 21 are not limited to round rods of ceramics, but may be of a triangular cross-sectional shape with a vertex thereof directed radially inwardly, or any of various other cross-sectional shapes including a rectangular cross-sectional shape, an elliptical cross-sectional shape, etc.

The stiffeners 21 may be of an elongate structure extending substantially the full length of the stator core 7 and may be mounted respectively in the slots 20. However, each of the stiffeners 21 may comprise a plurality of short members arranged in series. Such stiffeners can easily be manufactured and assembled efficiently.

Cylindrical coil end reinforcing tubes 22, each having an inside diameter which is the same as the inside diameter of the stator core 7, extend axially between the end faces of the stator core 7 and the end plates 13 of the casing 3. The stator can 15 is held against inner circumferential surfaces of the coil end reinforcing tubes 22 and the inner circumferential surface of the stator core 7. Each of the coil end reinforcing tubes 22 has a wall thickness matching the height of the stiffeners 21, i.e., the diameter of the round rods of ceramics used as the stiffeners 21.

Figure 1:
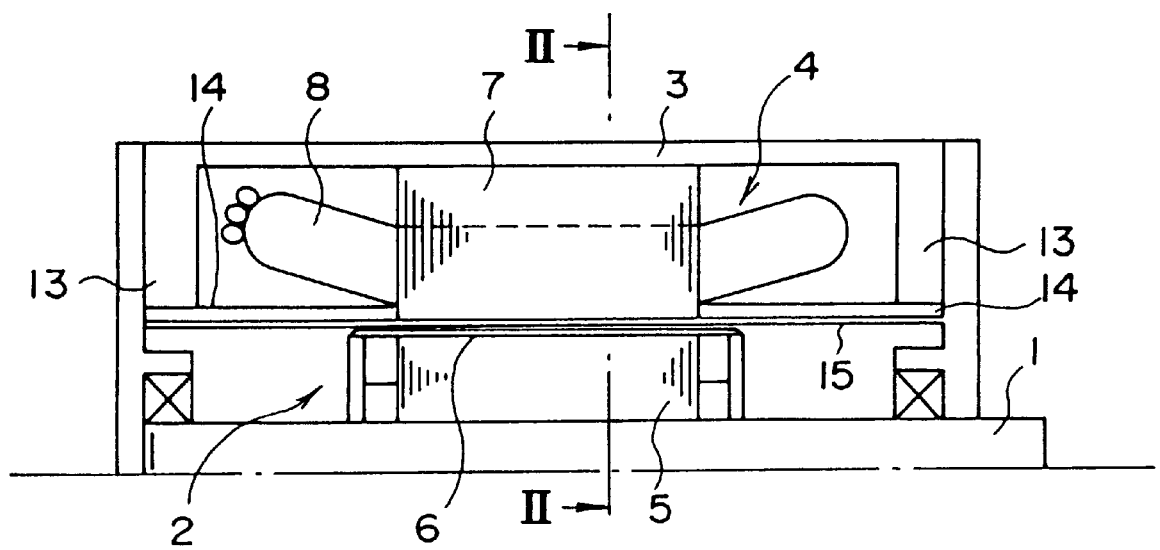
FIG. 1 is a fragmentary longitudinal cross-sectional view of a conventional canned motor.
Figure 2:
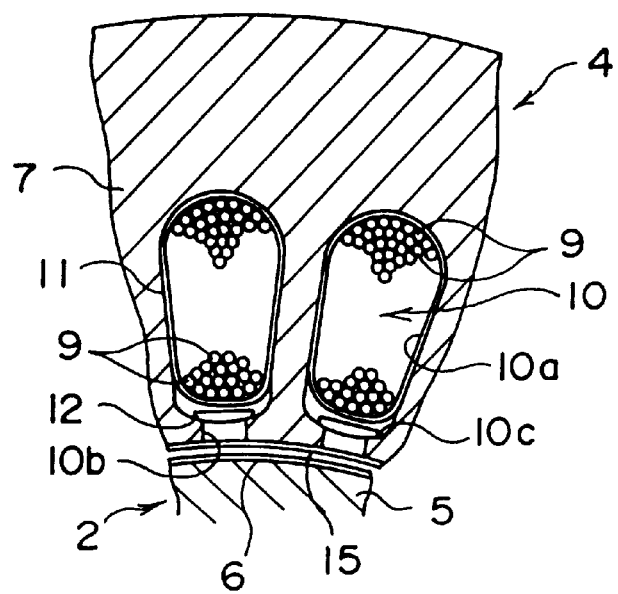
FIG. 2 is an enlarged fragmentary transverse cross-sectional view taken along line II—II of FIG. 1.

Since the stiffeners 21 are mounted in the stator core 7, the slots 20 have a relatively large radial depth, with the windings 9 and the coil ends 8 being positioned more radially outwardly than the windings 9 and the coil ends 8 of the conventional canned motor shown in FIG. 2. Therefore, the relatively thick coil end reinforcing tubes 22 can be joined to the opposite axial ends of the stator core 7.

Because the coil end reinforcing tubes 22 are relatively thick and hence strong, they are effective in preventing the stator can 15 from being deformed in regions axially outwardly from the opposite axial ends of the stator core 7.

The stator can 15, which is of a cylindrical shape having a small wall thickness, is fixed to and covers continuous inner circumferential surfaces of the coil end reinforcing tubes 22 and the stator core 7. The stator can 15 prevents the fluid which is being handled by the pump from entering into the stator 4.

Figure 5:
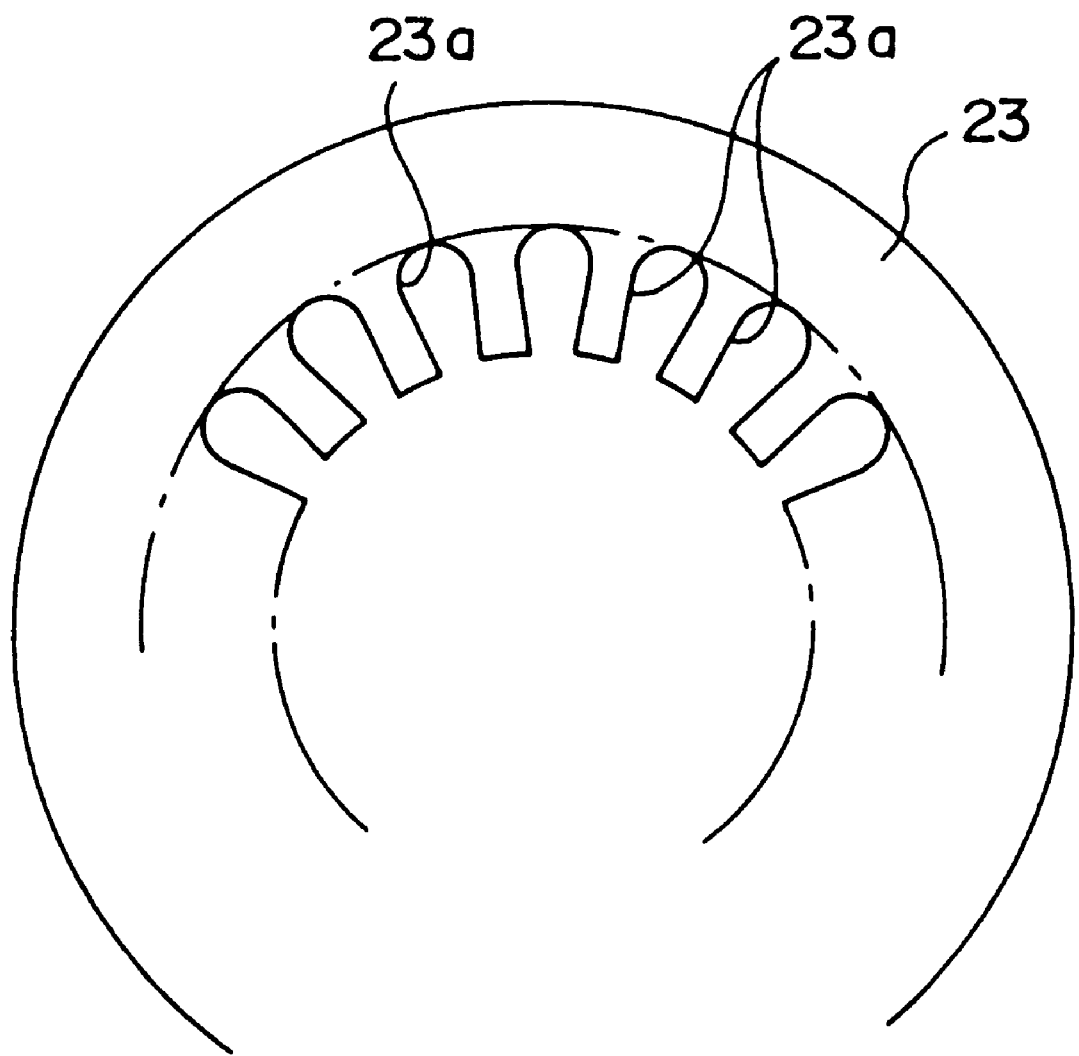
FIG. 5 is a fragmentary front elevational view of a reinforcing plate in the canned motor according to the present invention.

Substantially disk-shaped reinforcing plates 23 are disposed at the junctions between the stator core 7 and the coil end reinforcing tubes 22. The reinforcing plates 23 have radially outer ends held against the inner circumferential surface of the casing 1 and radially inner ends held against the outer circumferential surfaces of the coil end reinforcing tubes 22. Each of the reinforcing plates 23 has a plurality of coil end insertion grooves 23a (see FIGS. 3 and 5) defined therein which extend radially outwardly from and are open at its inner circumferential edge. The coil ends 8 extend through the coil end insertion grooves 23a as shown in FIG. 3. The reinforcing plates 23 positioned at the respective axial ends of the coil end reinforcing tubes 22 prevent the coil end reinforcing tubes 22 from being unduly deformed, thus preventing the stator core 7 and the coil end reinforcing tubes 22 from being displaced relatively to each other and developing steps therebetween.

Although a certain preferred embodiment of the present invention has been shown and described in detail, it should be understood that various changes and modifications may be made therein without departing from the scope of the appended claims.

What is claimed is:

1. A canned motor comprising:

a rotor having a rotor core and a rotor can covering an outer circumferential surface of said rotor core; and a stator disposed around said rotor with a gap left therebetween for rotating said rotor, said stator having a stator core and a stator can covering an inner circumferential surface of said stator core;

said stator core having a plurality of slots defined therein at circumferentially spaced regular intervals at said inner circumferential surface of said stator core, each of said slots having an open end opening, and a plurality of windings disposed in said slots, respectively;

wherein each of said slots comprises integrally a stiffener chamber for accommodating a stiffener, which comprises a round rod of ceramics having a circular cross-sectional shape, and which is disposed radially outwardly of, and adjacent to, said inner circumferential surface of said stator core, a first constricted throat disposed radially inward from said stiffener chamber, a second constricted throat for supporting said stiffener which is disposed radially outwardly of, and adjacent to, said stiffener chamber, and a windings chamber for accommodating windings which is accommodated outwardly of, and adjacent to, said second constricted throat;

said first and second constricted throats each defining an opening which is smaller than a diameter of said round rod of ceramics.

2. A canned motor according to claim 1, further comprising cylindrical coil end reinforcing tubes joined to respective opposite axial ends of said stator core and each having a wall thickness substantially equal to a radial dimension of said stiffeners, said coil end reinforcing tubes having respective circumferential surfaces contiguous to said circumferential surface of said stator core, said stator can covering said circumferential surfaces of said coil end reinforcing tubes and said stator core.

3. A canned motor according to claim 1, wherein said stiffener is in spaced relation to the winding provided in the slot in which said stiffener is provided.

4. A canned motor comprising:

a rotor having a rotor core and a rotor can covering an outer circumferential surface of said rotor core; and a stator disposed around said rotor with a gap left therebetween for rotating said rotor, said stator having a stator core and a stator can covering an inner circumferential surface of said stator core;

said stator core having a plurality of slots defined therein at circumferentially spaced regular intervals at said inner circumferential surface of said stator core, each of said slots having an open end opening, and a plurality of windings disposed in said slots, respectively;

wherein each of said slots comprises integrally a stiffener chamber arranged between said plurality of windings and said stator can, a windings chamber for accommodating windings, and at least one constricted throat provided between said winding chamber and said stiffener chamber;

said at least one constricted throat defining a first opening which is smaller than a width of said stiffener.

5. A canned motor according to claim 4, wherein each of said stiffener comprises a round rod of ceramics having a circular cross-sectional shape.

6. A canned motor according to claim 4, further comprising cylindrical coil end reinforcing tubes joined to respective opposite axial ends of said stator core and each having a wall thickness substantially equal to a radial dimension of said stiffeners, said coil end reinforcing tubes having respective circumferential surfaces contiguous to said circumferential surface of said stator core, said stator can covering said circumferential surfaces of said coil end reinforcing tubes and said stator core.

7. A canned motor according to claim 6, wherein each of said stiffener comprises a round rod of ceramics having a circular cross-sectional shape.

8. A canned motor according to claim 6, wherein each of said stiffener comprises a round rod of ceramics having a circular cross-sectional shape, and wherein said second opening is smaller than a diameter of said round rod of ceramics.

9. A canned motor according to claim 4, wherein said stiffener is in spaced relation to the winding provided in the slot in which said stiffener is provided.

10. A canned motor according to claim 4, further comprising a plate provided between the winding which is provided in the slot in which the stiffener is provided, and said stiffener chamber, so as to prevent the winding from passing through said at least one constricted throat into said stiffener chamber.

11. A canned motor according to claim 4, further comprising a second constricted throat provided between said stiffener chamber and said stator can, said second constricted throat defining a second opening which is smaller than a width of said stiffener.

* * * * *